June 29, 1937.                 G. BAARS                 2,085,522
                  APPARATUS FOR FRACTIONAL DISTILLATION
                          Filed Nov. 1, 1934
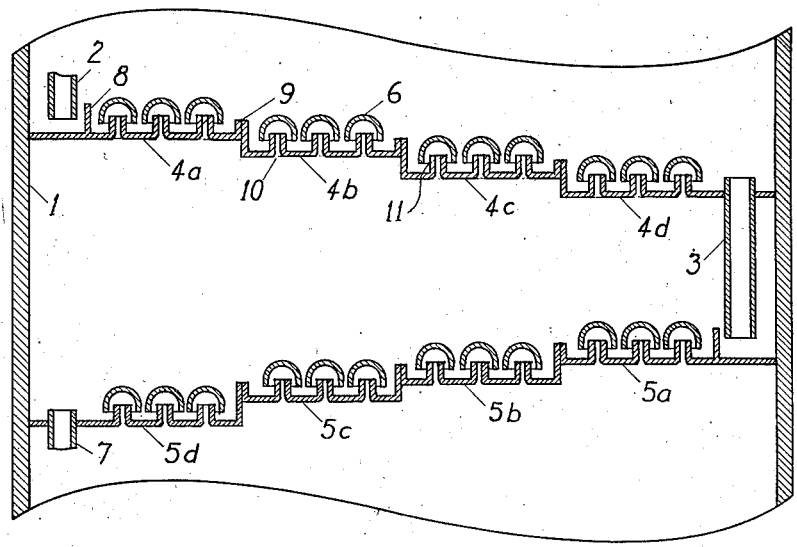
Inventor: Gerrit Baars
By His Attorney:

Patented June 29, 1937

2,085,522

UNITED STATES PATENT OFFICE 2,085,522

APPARATUS FOR FRACTIONAL DISTILLATION

Gerrit Baars, The Hague, Netherlands, assignor to Shell Development Company, San Francisco, Calif., a corporation of Delaware Application November 1, 1934, Serial No. 750,954
In the Netherlands November 4, 1933

2 Claims. (Cl. 261—114)

This invention pertains to the art of fractional distillation and/or condensation of hydrocarbon oils, alcohols and similar complex mixtures, and is more specifically concerned with an apparatus designed to insure a thorough contact between the liquid and the gaseous components of such mixtures.

A process of fractional distillation or condensation, whose purpose it is to separate a liquid mixture into fractions of different compositions and boiling ranges, usually consists in bringing this liquid mixture to a desired temperature and introducing it into a separating zone, such as a fractionating column, in which the vapours of the heated liquid rise counter-currently and in contact with a liquid reflux descending through the column. The column itself is provided with means promoting an intimate contact between the liquid and the vapour phases, such, for example, as bubble trays or fractionating plates on which a part of the liquid accumulates in its downward course through the column, while the ascending vapours are made to pass through a number of special perforations provided in the plates. For this purpose, small pipes are inserted in these perforations so as to have their upper orifices above the level of the liquid on the plate. These vapour risers are provided with so-called bubble caps, or similar devices, by means of which the vapours are forced to pass through the liquid before ascending further through the column.

The plates are also provided with downspout or overflow pipes to permit a downward flow of liquid from plate to plate. These downspouts are usually staggered on alternate plates in such manner as to cause a flow of the liquid in a horizontal direction on each plate in addition to the vertical flow from plate to plate. Thus the liquid passes from one end of a plate to the opposite end, thence down to the next plate, over this plate in an opposite direction, and down to the next lower plate.

In the course of operating fractionating columns of this type, it was found by observing the way in which liquid and vapours intermingle on each plate that the vapours often pass only through a part of the liquid on that plate, namely through that part which is adjacent to the downspout opening. This is to be accounted for by the fact that a difference in liquid head must exist between opposite ends of each plate in order to create a horizontal flow of liquid on that plate. The depth of the liquid layer on the plate is accordingly greatest at the point where the liquid is admitted on the plate, and smallest at the point where it leaves the plates. The liquid head being smallest around the downspout, it naturally offers the least resistance to the flow of vapours through the liquid, which flow is therefore deflected in that direction.

From these observations it was concluded that in many cases a considerable part of each tray is inoperative, no contact between vapours and liquid taking place thereon. Since an intimate and thorough contact between vapours and liquid is essential for proper fractionation, the partial contact described above results in a decrease of the efficiency of the column and in an insufficiently sharp fractionation.

It is therefore the purpose of this invention to counteract this drawback and to insure a maximum possible contact between the liquid and the vapours in the column. The apparatus used according to this invention consists in a conventional fractionating column which shall not be described here, provided with a desired number of fractionating plates or similar partitions. These plates are equipped with vapour uptakes, bubble caps, downspouts or other means permitting a downward flow of the liquid and an upward flow of the vapours through the column. These fractionating plates are composed of several successive elements having overflow partitions between them, the bottom of each succeeding element being lower than that of the preceding one. This construction of the plates ensures a uniform flow of vapour through the whole layer of liquid throughout each element.

This will be further made clear by the accompanying drawing, giving a sectional view in part of a fractionating column 1, in which two plates 4 and 5 are shown. Each plate consists of four elements $a$, $b$, $c$ and $d$. The liquid flows, for example, from a higher plate (not shown) through the downspout 2 on to the highest element 4a of plate 4, passes over the overflow partition 8 and over the overflow partition 9, between elements 4a and 4b to the next lower element 4b, and so on further through element 4c to element 4d, where the liquid flows through the downspout 3 to the highest element 5a of the next lower plate. Over this plate the liquid flows in a direction opposite to that in which it passed over plate 4, and leaves it by means of downspout 7. In the bottom of each plate element there are openings 10 with pipes 11, having their upper orifices above the liquid level and provided with caps 6, all arranged in such a manner that the vapour is forced to pass through the liquid in the element before ascending further to the next plate. It is understood that the number of elements of which the plate is composed may vary. The principle of the invention may also be applied when conducting the liquid over one tray several times, for example, in opposite directions, before allowing it to pass to the next tray. This may be achieved by dividing the plate into channels by means of partitions roughly perpendicular to partitions 8 and 9, while the path followed by the liquid over the plate still passes over a plurality of successively lower elements.

I claim as my invention:

1. In a column for contacting a liquid with vapors, a perforated bubble plate comprising a series of horizontal progressively descending troughs separated from each other by vertical overflow weirs arranged to maintain pools of liquid of substantially the same depth in all troughs whereby introduction of liquid into the highest trough will cause a cascade-like liquid flow through said series of troughs, hooded means for passing vapors through the plate, means for supplying the liquid to the highest trough of the plate and means for withdrawing the liquid contacted with the vapors from the plate.

2. In a fractionating column, a plate comprising a perforated bubble series of horizontal progressively descending troughs extending across the column and separated from each other by vertical overflow weirs arranged to maintain pools of liquid reflux of substantially the same depth in all troughs whereby introduction of liquid into the highest trough will cause directional cascade-like liquid flow through said series of troughs, means for passing vapors through the plate, hooded means for supplying reflux to the uppermost trough and means for withdrawing the liquid from the lowermost trough.

GERRIT BAARS.

CERTIFICATE OF CORRECTION.

Patent No. 2,085,522. June 29, 1937.

GERRIT BAARS.

It is hereby certified that error appears in the printed specification of the above numbered patent requiring correction as follows: Page 2, second column, lines 8 and 9, claim 2, for the words "plate comprising a perforated bubble" read perforated bubble plate comprising a; line 18, same claim, strike out "hooded" and insert the same before "means" in line 17, same claim; and that the said Letters Patent should be read with these corrections therein that the same may conform to the record of the case in the Patent Office.

Signed and sealed this 21st day of September, A. D. 1937.

Henry Van Arsdale
(Seal) Acting Commissioner of Patents.